June 24, 1941. B. C. MOISE 2,246,891
JOINT FOR STEP-DOWN PIPE PILING
Filed June 30, 1939
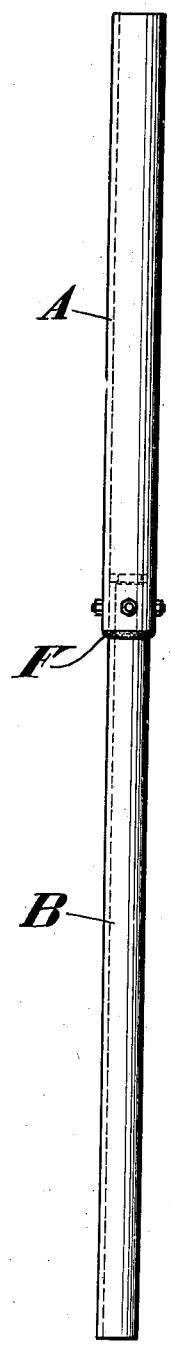
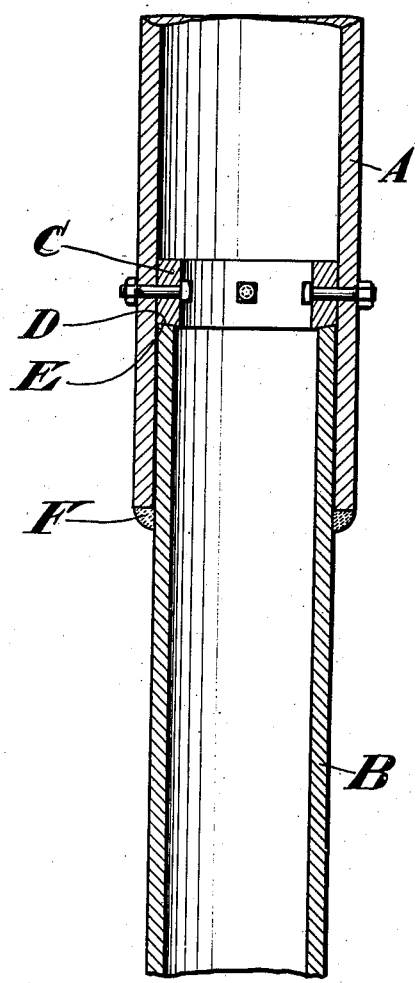
Inventor:
BOLTON C. MOISE,
by: John E. Jackson
his Attorney.

Patented June 24, 1941

2,246,891

UNITED STATES PATENT OFFICE 2,246,891

JOINT FOR STEP-DOWN PIPE PILING

Bolton C. Moise, Pittsburgh, Pa., assignor to National Tube Company, a corporation of New Jersey Application June 30, 1939, Serial No. 282,310

1 Claim. (Cl. 285—115)

This invention covers a form of joint for step-down pipe piling which is simple, inexpensive and efficient. By step-down pipe piling is meant piling made up of sections of pipe whose diameters decrease from top to bottom, thereby obtaining the advantages offered by the use of a tapered pile.

The difficulty in driving piling of this type is to join two sections of pipe of different diameter by means that will align the components of the pile axially throughout its length, overcome forces that tend to collapse the pipes at their ends, and transmit efficiently in the longitudinal direction of the pile the driving blows or forces administered to it at the upper end.

In driving piling of uniform diameter throughout these problems are not confronted. Alignment is easily obtained by a sleeve that will hold the pipe sections in abutting relation. Collapsing tendencies do not prevail as the driving forces remain in the same cylindrical surface throughout the length of the pile, which also permits them to be transmitted at practically 100 per cent efficiency.

In the step-down pile these forces must be transferred at each joint from the cylindrical surface of one diameter to one of smaller diameter. This transfer of these forces from a circle of large diameter to one of smaller diameter at this point takes place by changes in direction at the point of union, which forces acting in these changed directions tend to expand or collapse the ends of the pipes. It is, therefore, desired in the transfer of these forces at these joints to obtain a resultant that will transmit the maximum percentage to driving effort. This is accomplished by the joint of this invention.

Referring to the drawing:

Figure 1 is a vertical section at the point of union of two sections of piling of different diameter embodying the joint of the present invention; and Figure 2 is an elevation on a reduced scale.

In the construction of this joint, a ring C is securely fastened to the interior of the large diameter pipe A at a distance from the end thereof to permit the telescoping of smaller diameter pipe B to a degree that will place it in axial alignment with the pipe A and retain it in that position. The lower end of a ring C may be beveled outwardly, as shown at D, and the end of the pipe B may have a complementary bevel, as at E, to register with it. The purpose of these bevels is to overcome tendencies of the pipe B to collapse under blows driving the pile. Outward expansion is retarded by the pipe A. The overlapping of the two pipes at the joint reenforce this section of the pile against bending forces. The ring C and pipe A, forming practically an integral unit, and the pipe A telescoping the pipe B to such an extent as to prevent any deflection of the pile or its components at this point, enable the driving force of the hammer to be transmitted to the pipe B with a maximum of efficiency.

The joint may also be welded at F, if desired, thereby adding greater rigidity to the union.

The advantages of a joint of this kind, made by telescoping the smaller pipe by the larger and driving the smaller by a ring contained in the larger, are that a minimum of surface normal to the driving force is presented by the increase in the pile diameter at this point for the resistance to the soil; that the impact to overcome this resistance is delivered by the rigid body of the large pipe with all its momentum and not through a loosely connected coupling, thus being more effective in having no lost motion; that a reenforcement of the pile at the joint is obtained through the telescoped ends of the pipes; and that any tendency toward collapse by the smaller pipe at the end is counteracted by the bevel on the ring forcing it in the opposite direction.

The joint is compact and is quickly made by simply telescoping the larger pipe over the smaller, the ring in the larger having already been secured therein by bolting, welding, shrinking, or a combination of any two or all three. The weld F may be added, if desired.

While I have shown and described one specific embodiment of my invention, it will be understood that I do not wish to be limited thereto since various modifications may be made without departing from the scope of the invention, as defined in the appended claim.

I claim:

A driving joint for step-down piling including a pair of telescoped cylindrical pipes, said joint comprising an annular sleeve-like ring, means for securing said ring within the larger of said pipes, the telescoped end of the smaller of said pipes being abutted against the adjacent end of said ring, said ring being substantially spaced from the telescoping end of the larger of said pipes, the contacting areas of said ring and the smaller of said pipes being complementarily beveled radially toward said ring.

BOLTON C. MOISE.